United States Patent [19]

Eaneff

[11] Patent Number: 4,991,758
[45] Date of Patent: Feb. 12, 1991

[54] SUPPORT SYSTEM FOR PORTABLE VIDEO CAMERA

[76] Inventor: Charles S. Eaneff, 1100 Edgewood Rd., Redwood City, Calif. 94062

[21] Appl. No.: 410,869

[22] Filed: Sep. 22, 1989

[51] Int. Cl.⁵ .............................................. G03B 29/00
[52] U.S. Cl. ....................... 224/208; 354/82; 224/908; 224/264; 224/200; 224/257
[58] Field of Search .............. 224/208, 908, 202, 205, 224/254, 257, 258, 264, 265, 266, 200; 354/82, 293

[56] References Cited

U.S. PATENT DOCUMENTS

| | | | |
|---|---|---|---|
| 817,207 | 4/1906 | Wheeler | 354/82 |
| 3,661,308 | 5/1972 | Walters | 224/908 |
| 3,767,095 | 10/1973 | Jones | 224/908 |
| 3,784,068 | 1/1974 | Pistilli | 224/908 |
| 4,158,488 | 6/1979 | Gottschalk et al. | 224/908 |
| 4,327,986 | 5/1982 | Carter | 354/82 |

Primary Examiner—Henry J. Recla
Assistant Examiner—Keith Kupferschmid
Attorney, Agent, or Firm—John J. Leavitt

[57] ABSTRACT

A support system to be worn by a person who is required to carry heavy loads on one shoulder. The support system includes a strap arrangement that transfers part of the load from one shoulder to the other shoulder so that the load is balanced between the two shoulders. Additionally, the system provides a shock absorber for supporting loads spaced forwardly of the shoulder, thus leaving the load-carrier's hand free to merely guide the load instead of supporting the weight of the load with his free hand.

12 Claims, 2 Drawing Sheets

FIG _ 1
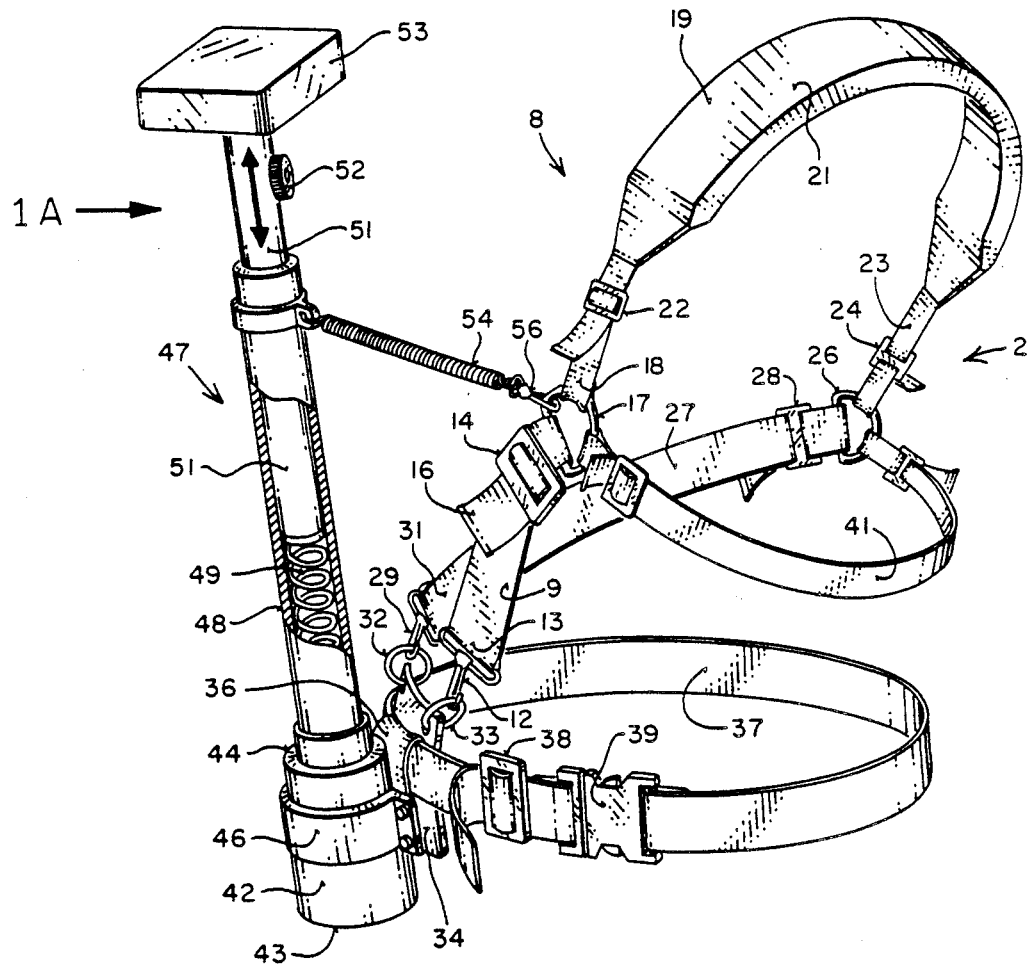
FIG _ 1A
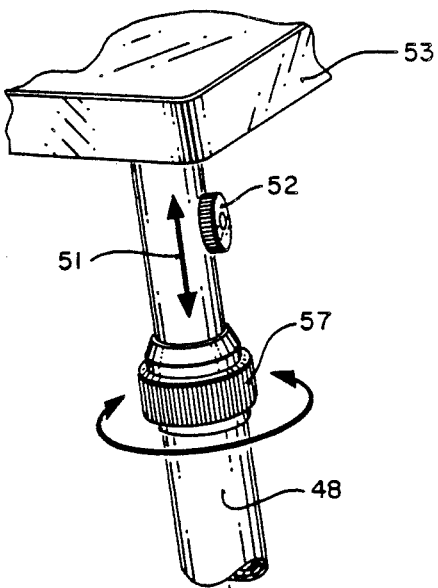

SUPPORT SYSTEM FOR PORTABLE VIDEO CAMERA

BACKGROUND OF THE INVENTION

1. Field of the Invention

This invention relates to support structures or support systems, and particularly to a portable support structure for supporting heavy loads on one shoulder, such as portable video cameras of the type used by professional television broadcast photographers and "still" cameras equipped with long lenses.

2. Description of the Prior Art

It has long been thought that the only way to secure studio-quality television broadcast film with a portable video camera was to mount the video camera on a stationary tripod, or to steady the video camera against an immovable object such as a wall or pillar. But mounting the video camera atop a tripod means that when it is necessary to move the camera to follow the subject being photographed the tripod must also be moved. Since most commercial tripods of the type sturdy enough to support a heavy professional-type video camera are themselves heavy and awkward to move because of the depending leg structure, it has been a continuing problem to provide the degree of mobility that is often required to photographically follow the action with a tripod-mounted video camera. Accordingly, one of the principal objects of the present invention is the provision of a portable video camera support structure that enables free mobility of the camera to follow the action being photographed, while supporting the camera in a steady state to enable the shooting of studio-quality video film. Applicant has been unable to find prior art in the literature or in photographic supply houses that solves this need.

A professional television broadcast cameraman is required to carry a heavy video camera cantilever-like on his shoulder while aiming the camera at the action being photographed. He must remain free to move bodily from one location to another to follow the action, while attempting to steady the forwardly projecting camera while shooting the scene. Because the camera projects forwardly of the cameraman, the center of gravity of the camera lies anteriorly of the cameraman, thus imposing a downwardly directed weight spaced forwardly from the body that must be supported to enable the camera to be trained on the scene. To support such a weight continuously for any reasonable length of time imposes severe stress and strain on the arm, back and shoulder muscles of the cameraman, resulting in fatigue that often prevents the cameraman from holding the camera sufficiently steady to shoot video film of the quality necessary for live broadcast of a scene. Therefore, another object of the invention is the provision of a video camera support structure that may be worn by the cameraman and which supports the weight of that portion of the video camera that projects forwardly from the shoulder.

Because of the great mobility that is required of the cameraman while shooting some scenes, jolting of the camera supported only by a tired arm incapable of absorbing the inertia of the moving camera causes sharp and sudden deflection of the camera, thus diminishing the quality of the photographed scene. It is therefore another object of the invention to provide a support system or structure to be worn by the cameraman that supports a major portion of the weight of the video camera, and which damps movement of the camera in relation to the cameraman and the support structure to thus enable the shooting of video film of broadcast quality with highly portable video camera.

Years of experience as a professional video broadcast cameraman has taught me that carrying a heavy video camera on one shoulder, as is the custom, results in the body reacting to retain the spine straight against the tendency of the weight of the camera to bend the spine in the direction of the camera. This reaction, in a surprisingly short interval, results in pain in the neck, shoulders, arms and back, and because of the fatigue thus produced, may also result in mediocre photography. Accordingly, a still further object of the invention is the provision of a camera support structure or system to be worn by a cameraman that transfers to the shoulder opposite the one carrying the camera part of the weight of the camera so that the load is balanced on the body, thus eliminating the need for the body to react by generating adaptive stress to support the load.

A still further object of the invention is the provision of a television broadcast type video camera support structure that minimizes the need for a tripod, that enables a surprising degree of steadiness for broadcast quality shooting of wide shots, telescopic and zoom shots, and which enables "air" quality video photography for sport shooting and "walking" shots.

A still further object of the invention is the provision of a video camera support structure or system adapted to be worn by a professional television broadcast photographer that may be worn with a variety of clothing types, depending upon the weather, without modifying the effectiveness of the structure or system.

A still further object of the invention is the provision of a video camera support structure or system adapted to be worn by a professional television broadcast cameraman for supporting the camera while photographing scenes, and which incorporates means for adjusting the degree of damping effect provided to accommodate impact shocks and jolts of the camera.

The invention possesses other objects and features of advantage, some of which, with the foregoing, will be apparent from the following description and the drawings. It is to be understood however that the invention is not limited to the embodiment illustrated and described since it may be embodied in various forms within the scope of the appended claims.

SUMMARY OF THE INVENTION

In terms of broad inclusion, the video camera support structure or system of the invention includes a harness to be worn by the cameraman, the harness for a right-handed cameraman, for instance, providing a main support strap adjustable in length and adapted to pass diagonally upwardly across the body from the lower right front portion of the torso near the hip bone, over the left shoulder and diagonally downwardly across the back and around the waist to join the opposite end of the strap directly at the lower right front portion of the torso, or joined to a support plate to which opposite ends of the strap are secured. At two locations along its length, the main support strap is provided with connecting means, such as D-rings between which an auxiliary retention strap may be connected to pass around the waist from front to back. Mounted at the juncture of the opposite ends of the main support strap is a socket adapted to receive the lower end of a shock absorbing assembly which projects vertically upwardly and terminates in a cushioned upper support end on which the camera is supported. Obviously, a ring adapted to support the shock absorber could be substituted for the socket, but the socket is preferred. Intermediate the upper and lower ends of the shock absorbing assembly, a resilient tether connects the column to the main support strap to thus resiliently limit the extension of the column in a direction away from the body of the cameraman. When appropriate, an encircling cinch strap or belt may have its opposite ends connected to the union of the opposite ends of the main support strap, or to the support plate to which they are attached, and extend about the cameraman's body just above the hip line to lend additional lateral support to the socket member in which the lower end of the upwardly projecting shock absorber assembly is supported.

BRIEF DESCRIPTION OF THE DRAWINGS

FIG. 1 is a perspective view of the video camera support structure, shown apart from the body of a cameraman and without a video camera supported thereon. Portions of the structure are broken away to reveal underlying structure.

FIG. 1A is a fragmentary perspective view of the upper end portion of a shock absorber column incorporating a height adjustment and ram control mechanism.

DESCRIPTION OF THE PREFERRED EMBODIMENT

Figure 2:
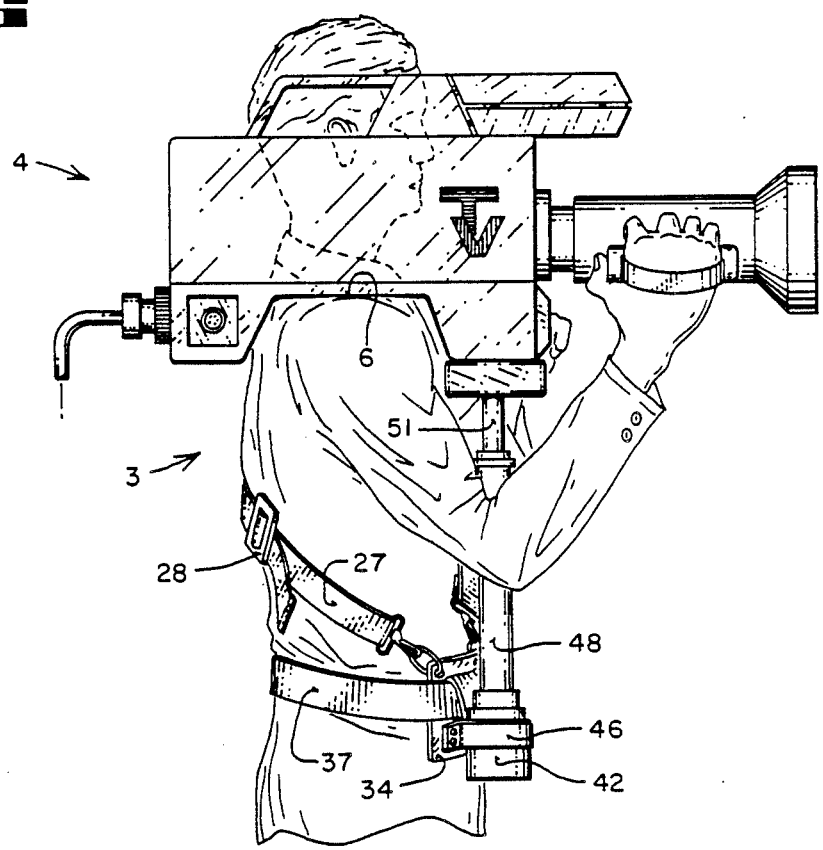
FIG. 2 is a side elevational view showing the video camera support structure or system worn by a cameraman and supporting a portable video camera in position of use.

In terms of greater detail, the video camera support structure or system of the invention comprises a harness designated generally by the numeral 2, and adapted to be worn by a cameraman 3 in such a manner that the load imposed on the body of the cameraman by the weight of the video camera 4 carried on one shoulder 6 (here the right shoulder) is partially distributed to the opposite (left) shoulder 7 to thus balance the load between the two shoulders of the cameraman.

Referring to FIG. 1, it will be seen that the harness forming a part of the support structure or system comprises a flexible main support strap designated generally by the numeral 8, and including a flexible anterior strap portion 9 having a spring clip 12 attached to its lower end 13 and a buckle 14 adjacent its opposite end through which the upper end portion 16 of the anterior strap portion may be threaded to adjustably and detachably anchor this end of the anterior strap portion to an anterior D-ring 17. Adjustably and detachably attached to the D-ring 17 is the anterior end portion 18 of the shoulder strap 19, preferably provided with a cushioning pad 21 to absorb some of the pressure exerted on the shoulder by the partial weight of the camera supported on the shoulder, while the remainder of the weight is suspended on the lower end of the main support strap 8. A buckle 22 provides for adjustment of the position of the shoulder strap cushioning pad 21 to fit different individuals.

Posteriorly, the shoulder strap portion of the main support strap terminates in a posterior portion 23 adjustably attached through a posterior buckle 24 to a posterior D-ring 26. To complete the main support strap designated generally by the numeral 8, there is adjustably and detachably attached to the posterior D-ring 26 a support strap extension 27 by means of a buckle 28. From its posterior connection with the D-ring 26, the strap extension 27 is adapted to sweep around the right side of the cameraman's body, terminating in a spring clip 29 anchored to the terminal end portion 31 of the strap extension 27.

Preferably, as shown, the spring clips 12 and 29 at opposite ends of the main support strap 8 are positioned anteriorly of the cameraman's body, positioned above the right hip joint for a right-handed cameraman, and attached to rings 32 and 33, respectively, which in turn are mounted at opposite corners of a generally flat support plate 34. The support plate 34 may conveniently be fabricated from metal, plastic or leather, and lies flat against the body in the general area between the right iliac region and the right lumbar region. In any event, it lies against the body of the cameraman in a position where it will not interfere with flexure of the right leg, as in walking or climbing stairs, and concomitantly, will itself not be displaced as to its positional location by such movements, thus increasing the stability of the support plate as will hereinafter be explained.

Figure 3:
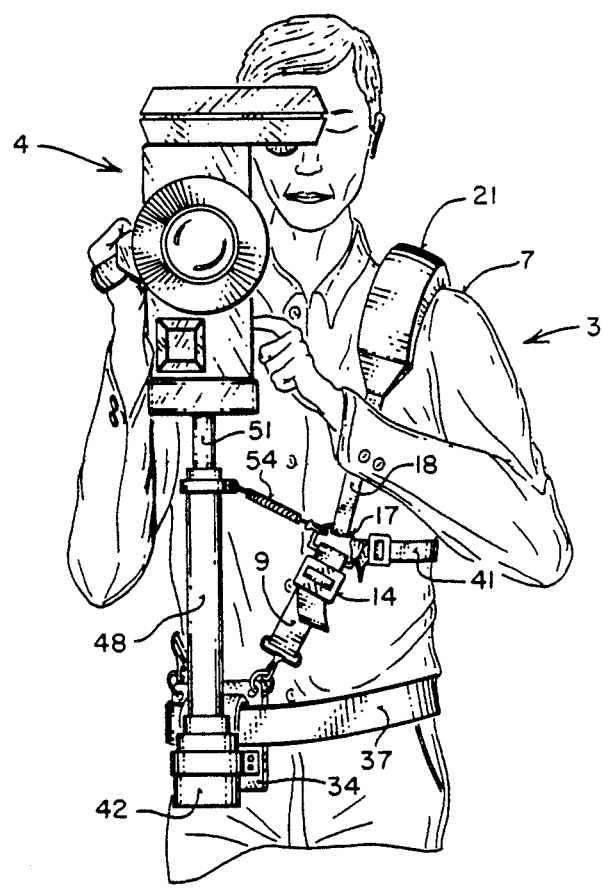
FIG. 3 is a front elevational view showing the video camera support structure or system worn by a cameraman and supporting a portable video camera in position of use.

To increase the lateral stability of the support plate 34, i.e, to retain it against movement from side-to-side, the support plate may be provided with a loop member 36 through which may be threaded a belt member 37 adapted to encircle the body of the wearer, and having a buckle 38 for adjustment of the size of the belt to provide a snug fit, and a quick-release fastener 39 for attachment and detachment of the belt. The belt 37 is particularly helpful during photography sessions that last all day, but is not considered an essential element of the combination, since the harness is fully operative without use of the belt. In the same manner, to lend additional stability to the harness as a whole, there is provided an auxiliary strap 41 adapted to encircle the left lumbar region of the cameraman as shown, the auxiliary strap being adjustably and detachably secured between the anterior D-ring 17 and the posterior D-ring 26. The fact that the auxiliary strap passes only partially around the body of the cameraman facilitates donning the harness, since all that is required is that the left arm be extended through the loop formed by the main support strap 8 and the shoulder pad 21 be position on the shoulder. It will thus be seen that any downward force exerted on the support plate 34 will cause tension in the main support strap in a diagonal direction across the anterior chest and abdominal regions of the cameraman, thus insuring that the shoulder pad will remain in position, while such diagonally applied force will also cause the auxiliary strap 41 to snugly encircle the left lumbar region as illustrated in FIG. 3. It should be noted however that for particularly active photography, where a maximum amount of stability of the harness is desired, it is possible to connect a second auxiliary strap between the D-rings 17 and 26, but which passes around the right lumbar region of the cameraman. Again, while such a second auxiliary strap may be desirable in certain situations, it is not an essential element of the combination and is therefore not illustrated in the drawings.

To support the weight of the camera at a point spaced anteriorly of the cameraman's body, particularly anteriorly of the right shoulder on which the camera is usually supported by a right handed cameraman as shown in FIGS. 2 and 3, there is provided mounted on the support plate 34 a socket 42 closed at its lower end 43 and open at its upper end 44. The socket is conveniently mounted on the support plate by a strap 46 that encircles the exposed surface of the socket and has its ends riveted to the support plate 34 as shown. Appropriate screws (not shown) pass through the support plate into the socket to further stabilize its mounting on the support plate.

Detachably supported in the socket 42 is a shock absorber assembly designated generally by the numeral 47, and including a lower housing portion 48 containing a coil compression spring 49, and an upper ram member 51 that fits snugly within the lower housing portion in a manner to enable axial displacement of the ram member in relation to the housing portion. Preferably, the slidable arrangement of the ram within the housing is airtight, so that as the ram is displaced downwardly against the spring the air below the ram is compressed and builds up an internal pressure within the ram higher than atmospheric pressure. To control the degree of pressure buildup, there is provided an air valve 52 on the ram, the air valve providing a measure of adjustment by release of air from the ram interior when the pressure exceeds a selected amount. It will thus be seen that between the spring constant of the spring 49 and the controllable pressure build-up selected for the ram, the linear displacement of the ram may be controlled within close limits determined by the weight of the camera. A very heavy camera may require a shock absorber having greater resistance to displacement, while a lighter camera may require a shock absorber having less resistance to displacement.

To support the camera, the upper end of the ram 51 is fitted with a camera mount, preferably a cushion block 53 upon which the camera may be deposited when it is hoisted onto the cameraman's shoulder. Obviously, many different types of mounts may be utilized to accommodate different makes of cameras or other loads supported by the ram. The cushion block may be flat on its upper surface as shown, or it may include a slight depression in the form of a shallow channel within which the underside of the camera 4 may be cradled. In any event, the resistance of the shock absorber ram 51 is adjusted to carry the weight of the camera distributed to the cushion block, the ram being depressed only sufficiently to maintain the line of sight of the camera lens horizontal as shown in FIG. 2. Under these circumstances, the only force required to be exerted by the right arm of the cameraman is a steadying and guiding force when he aims the camera at the scene he wishes to photograph. The portion of the weight of the camera that is carried by the ram is exerted downwardly on the support plate 34 and is ultimately transferred to the left shoulder of the cameraman through the main support strap 8. The weight of the camera is thus carried on both shoulders and is balanced therebetween so that the adaptive stress the body of the cameraman would otherwise have to exert to carry the unbalanced load if the camera were supported solely on one shoulder is eliminated.

While the mere weight of the camera resting on the cushion pad 53 will lend considerable stability to the upwardly extending and elongated shock absorber assembly 47 by virtue of the frictional engagement between the cushion pad and the underside of the camera, nevertheless, in the interest of safety and additional stability in the cooperation of the shock absorber with the cameraman and the camera, there is preferably provided a resilient tether 54 anchored at one end to the housing portion 48 adjacent its upper end as shown, and anchored at its other end by a detachable spring clip 56 to the anterior D-ring 17. The tether, together with the frictional interengagement of the cushion pad 53 and the camera, functions to retain the elongated shock absorber assembly in an upright attitude of use. While I have shown one form of tether, obviously, other forms may be used. When the camera is not supported on the cushion pad 53, the tether still functions to retain the elongated shock absorber in an upright attitude ready for mounting of the camera thereon.

It is conceivable that in certain instances of photographic activities it is desirable that the axial translation of the shock absorber ram 51 be inhibited either partially or totally. To accomplish this purpose, the embodiment of the shock absorber assembly illustrated in FIG. 1A is provided with a rotatable sleeve 57 threadably engaged with the upper end of the housing portion which functions as a collet to bind the ram 51 to the housing with a selected amount of force when the rotatable sleeve is appropriately adjusted. This feature is of advantage when cameras of different weights are used with the same support structure, thus enabling a surprising versatility in the use of the support structure.

Having thus described the invention, what is believed to be new and novel and sought to be protected by letters patent of the United States is as defined in the claims that follow.

I claim:

1. A support structure for a portable video camera operative to balance the weight of the camera on both shoulders of a cameraman carrying the camera, comprising:
  (a) a harness adapted to be donned by the cameraman and including a main support strap having opposite ends and anterior and posterior portions adapted to extend diagonally anteriorly and posteriorly of the torso of the cameraman and over a shoulder to form a weight-transferring loop; and
  (b) a shock absorber assembly mounted on the harness and adapted to be supportingly interposed between the harness and a video camera the weight of which is partially supported directly on a shoulder of the cameraman with the remaining weight of the camera being transferred to the other shoulder of the cameraman via the harness.

2. The support structure according to claim 1, in which said main support strap passes over one shoulder of the cameraman and the camera is supported on the other shoulder of the cameraman.

3. The support according to claim 1, in which said harness includes a support plate connected to said opposite ends of said main support strap and is supported thereby and in turn supports the weight of said shock absorber assembly and camera and when so connected is disposed above the right hip joint of the cameraman when said harness is donned.

4. The support structure according to claim 3, in which said harness includes a cinch belt connected to said support plate connected to opposite ends of said main support strap and adapted to selectively encircle the body of the cameraman to retain said support plate and the opposite ends of said main support strap against lateral displacement in a direction away from the torso of the cameraman.

5. The support structure according to claim 1, in which said main support strap is flexible.

6. The support structure according to claim 1, in which said main support strap includes an anterior portion and a posterior portion interconnected by a shoulder portion.

7. The support structure according to claim 1, in which opposite ends of said main support strap are interconnected at the iliac region of the wearer's body when said harness is donned, and means are provided associated with said interconnected opposite ends to detachably support said shock absorber assembly.

8. The support structure according to claim 1, in which a socket is mounted on said harness, said shock absorber assembly is detachably supported in said socket, and said shock absorber assembly includes an elongated tubular housing portion one end of which is supported in said socket, and a ram member having one end portion extending into said elongated tubular housing portion and projecting upwardly when said harness is donned and the opposite end of the ram member remote from the socket lies generally level with one shoulder of the cameraman when wearing the support structure.

9. The support structure according to claim 8, in which a cushion pad is provided on the end of said ram remote from the housing to form a cradle for reception of said video camera thereon.

10. A support structure for a portable video camera operative to balance the weight of the camera on both shoulders of a cameraman carrying the camera, comprising:
    (a) a harness adapted to be donned by the cameraman and including a main support strap having opposite ends and anterior and posterior portions adapted to extend diagonally anteriorly and posteriorly of the torso of the cameraman and over a shoulder to form a weight-transferring loop;
    (b) a shock absorber assembly mounted on the harness and adapted to be supportingly interposed between the harness and a video camera supported on a shoulder of the cameraman: and
    (c) said harness including an auxiliary retention strap connected between said anterior and posterior portions of said main support strap whereby when said harness is donned said auxiliary retention strap snugly encircles a lumbar region of the wearer.

11. A support structure for a portable video camera operative to balance the weight of the camera on both shoulders of a cameraman carrying the camera, comprising:
    (a) a harness adapted to be donned by the cameraman and including a main support strap having opposite ends and anterior and posterior portions adapted to extend diagonally anteriorly and posteriorly of the torso of the cameraman and over a shoulder to form a weight-transferring loop;
    (b) a shock absorber assembly mounted on the harness and adapted to be supportingly interposed between the harness and a video camera supported on a shoulder of the cameraman;
    (c) a socket mounted on said harness, said shock absorber assembly being detachably supported in said socket, said shock absorber assembly including an elongated tubular housing portion one end of which is supported in said socket, a ram member having one end portion extending into said elongated tubular housing portion and projecting upwardly when said harness is donned and the opposite end of the ram member remote from the socket lies generally level with one shoulder of the cameraman when wearing the support structure; and
    (d) a tether connected between said elongated tubular housing portion of said shock absorber assembly and said harness to limit anterior displacement of said shock absorber assembly in relation to said harness.

12. A support structure for a portable video camera operative to balance the weight of the camera on both shoulders of a cameraman carrying the camera, comprising:
    (a) a harness adapted to be donned by the cameraman and including a main support strap having opposite ends and anterior and posterior portions adapted to extend diagonally anteriorly and posteriorly of the torso of the cameraman and over a shoulder to form a weight transferring loop;
    (b) a shock absorber assembly mounted on the harness and adapted to be supportingly interposed between the harness and a video camera supported on a shoulder of the cameraman;
    (c) a socket mounted on said harness, said shock absorber assembly being detachably supported in said socket, said shock absorber assembly including an elongated tubular housing portion one end of which is supported in said socket, a ram member having one end portion extending into said elongated tubular housing portion and projecting upwardly when said harness is donned and the opposite end of the ram member remote from the socket lies generally level with one shoulder of the cameraman when wearing the support structure; and
    (d) said shock absorber assembly includes an air-tight cylinder in said housing, said ram member being slidably disposed in said air-tight cylinder whereby axial displacement of said ram member into said cylinder results in elastic compression of air therewithin, and valve means are provided on said ram member selectively manipulable to control the limits of said elastic compression.

* * * * *